J. Degnon.

Steam Engine Governor.

No. 3,359. Reissued Apr. 6, 1869.

Witnesses;
Wm. Brown
D. W. B. Comington.

Inventor;
John Degnon

United States Patent Office.

JOHN DEGNON, OF CLEVELAND, OHIO.

*Letters Patent No.* 56,908, *dated August* 7, 1866; *reissue No.* 3,359, *dated April* 6, 1869.

IMPROVEMENT IN GOVERNORS.

The Schedule referred to in these Letters Patent and making part of the same.

*To all whom it may concern:*

Be it known that I, JOHN DEGNON, of Cleveland, in the county of Cuyahoga, and State of Ohio, have invented certain new and useful Improvements in Governors or Regulators for Steam-Engines; and I do hereby declare that the following is a full and exact description of the same, reference being had to the accompanying drawings, and to the letters of reference marked thereon, in which—

Figure 1:
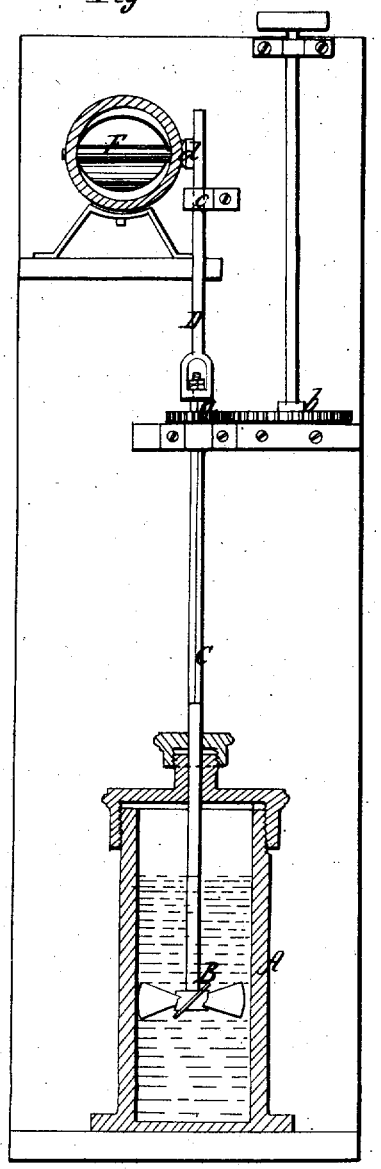

Figure 1 is a sectional front elevation; and

Figure 2:
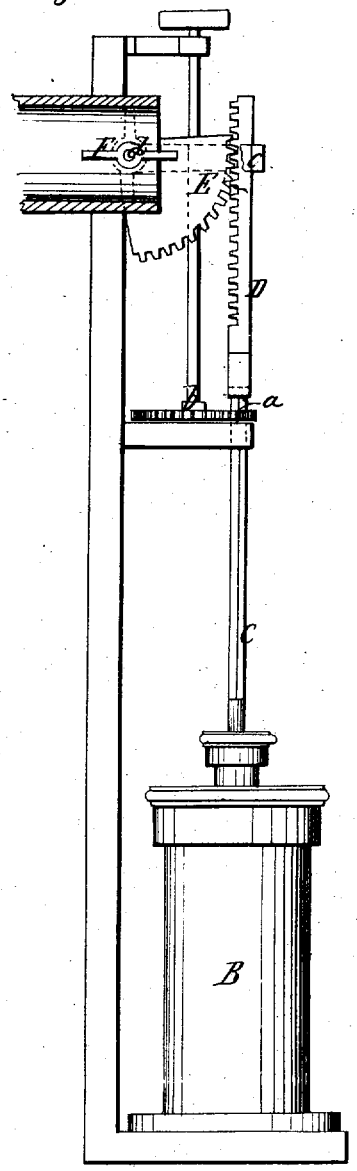

Figure 2, a sectional side elevation.

It is requisite in steam-engines for either land or marine purposes, that the movement of the engine shall be regular and uniform to the nearest possible degree, more particularly so in the case of engines used on land, than those used at sea or on rivers, and to effect this object is the purpose of my invention, which consists in placing a fan or propeller-wheel in a suitable case filled with water or other liquid, so connected and arranged in relation to the throttle-valve of the engine, as when driven at the proper speed to control and govern the movement of the throttle-valve, and through that to control and govern the movement of the engine to which the apparatus is attached.

A represents a cylinder, made of any proper material, closed at both ends, and filled, (or nearly so,) with water, or any other desired liquid.

B is a propeller, or fan-wheel, which is placed within the cylinder A, and attached to the shaft, or spindle C, and revolved by suitable means, by the engine, which is required to be governed or regulated in its movement.

As shown in the drawings, this propeller, or fan-wheel is attached to the shaft, or spindle C, by being secured to its lower end, but it is apparent that the same result could be produced if the said shaft, or spindle were retained in place, and an attachment made to the propeller-wheel, so that its movement were made upon the shaft with suitable attachments and connections to regulate the throttle-valve.

It is requisite that the propeller, or fan-wheel should be so connected to and driven by rotating-movement of the engine, which it is intended to govern, as that it shall be held in suspension in or near the middle of the case, or cylinder containing it, when the engine is running at proper speed, allowing room for the same to drop to the bottom of the cylinder to open the throttle-valve when the engine is running too slow, and to rise to the top of the same to close the throttle-valve when the engine is running too fast.

The means for revolving the propeller, or fan-wheel can be varied to suit the locality in which it may be placed, and the means for communicating the motion of the propeller, or fan-wheel to the throttle-valve, can be also varied to suit the circumstances under which it is placed and located, no one special arrangement of means being suitable to effect these objects under all the conditions in which the governor may be placed and employed.

What I claim as my invention, and desire to secure by Letters Patent, is—

1. The combination of the cylinder A and the propeller B, with the throttle-valve of a steam-engine, and the intermediate devices, substantially as herein set forth.

2. The combination of the cylinder A and the propeller B, with an arrangement of devices, whereby to transmit motion, and communicate changes of the said wheel to the throttle-valve of a steam-engine, as herein stated.

3. The combination of the propeller B, revolving in water in the cylinder A; the spindle C, and rack D, applied with the toothed segment E, attached to the spindle *d*, operated through the medium of the gearing *a b*, substantially in the manner represented and described.

JOHN DEGNON.

Witnesses:

FRANCIS S. LOW,

C. H. CHESEBRO.